UNITED STATES PATENT OFFICE 2,264,757

ORGANIC VULCANIZING AGENT

Paul C. Jones, Akron, Ohio, assignor to The B. F. Goodrich Company, New York, N. Y., a corporation of New York No Drawing. Application April 21, 1939, Serial No. 269,209

6 Claims. (Cl. 260—775)

This invention relates to the art of rubber manufacture and has as its chief object to provide a new and improved class of vulcanizing agents.

The process of this invention consists in vulcanizing rubber in the presence of an aliphatic thiazyl polysulfide. Although sulfur may be employed if desired, it is by no means necessary, and vulcanizates having good properties may be obtained by curing rubber in the presence of an aliphatic thiazyl tetrasulfide without adding free sulfur and in the presence or absence of an organic accelerator.

The aliphatic thiazyl polysulfides contain the group

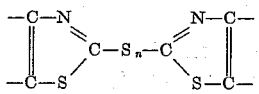

wherein $n$ is one of the integers 3 and 4 and the adjoining carbon atoms do not constitute part of another ring structure. Typical materials within this class include di-4,5-dimethylthiazyl tetrasulfide, di-4-ethylthiazyl tetrasulfide, di-4-methoxythiazyl tetrasulfide, di-4-methyl-5-ethylthiazyl tetrasulfide, etc., and the corresponding trisulfides. The preferred compounds contain hydrogen or alkyl groups on the adjoining carbon atoms. Compounds such as di-4-phenylthiazyl tetrasulfide which contain an aryl group on one or both of the adjoining carbon atoms are properly considered to be aliphatic thiazyl compounds since the adjoining carbon atoms are not included in another ring structure, and such compounds are within the broad scope of this invention.

The accelerators of this invention are in general, amber oils which possess very little odor. The ease with which they may be milled into rubber is one of the outstanding advantages accompanying their use.

In an embodiment of the method of this invention, the following compositions were prepared:

|  | A | B |
|---|---|---|
| Rubber | 100 | 100 |
| Zinc oxide | 5 | 5 |
| Stearic acid | 1 | 1 |
| Di-4,5-dimethylthiazyl tetrasulfide | 3 | 6 |

When these compositions were cured for varying times in a mold at 287° F., the vulcanizates had the following properties, T signifying tensile strength in lbs./in.$^2$ at break and E signifying the ultimate elongation in per cent:

| Time of cure | A | | B | |
|---|---|---|---|---|
|  | T | E | T | E |
| 15 min | 1,905 | 810 | 3,220 | 735 |
| 30 min | 2,355 | 825 | 3,340 | 735 |
| 45 min | 2,370 | 835 | 2,955 | 710 |

The behavior of the vulcanizing agents in the presence of an auxiliary accelerator was illustrated by curing at 287° F. a composition containing rubber 100 parts by weight, zinc oxide 5 parts, stearic acid 1 part, di-4,5-dimethylthiazyl tetrasulfide 3 parts, and 1 part of mercapto alkyl thiazole accelerator containing about 80 parts of 2-mercapto-4,5-di-methylthiazole and 20 parts of 2-mercapto-4-ethylthiazole. The vulcanizates had the following properties:

| Time of cure | T | E |
|---|---|---|
| 15 min | 2,730 | 860 |
| 30 min | 2,755 | 830 |

In another embodiment, di-4,5-dimethylthiazyl tetrasulfide was employed as the sole vulcanizing and accelerating agent in the following tire tread stock:

| | |
|---|---|
| Rubber | 100 |
| Channel black | 52 |
| Zinc oxide | 3.10 |
| Pine tar | 1.85 |
| Lauric acid | 2.10 |
| Palm oil | .50 |
| Antioxidant | 1.00 |
| Di-4,5-dimethylthiazyl tetrasulfide | 3.00 |

When this composition was cured for varying times at 280° F., vulcanizates with the following tensile and elongation characteristics were obtained:

| Time of cure | T | E |
|---|---|---|
| 15 min | 2,410 | 710 |
| 30 min | 3,740 | 690 |
| 45 min | 3,670 | 635 |
| 75 min | 3,720 | 615 |

Not only did this composition have a flat rate of cure, but the use of a vulcanizing agent other than directly-added free sulfur produced a stock having low hysteresis and good flex-resistance.

Although the use of the vulcanizing agents of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc., may be vulcanized in the manner herein described. The vulcanizing agent may be incorporated in the rubber by mastication, milling or any similar process, or in the case of latex, rubber cement, or any other natural or artificial dispersion or solution of rubber by simply dissolving or suspending the accelerator therein.

The vulcanization may be performed in other manners than that particularly set forth in the specific examples; specifically, rubber compositions may be heated in hot air, steam, hot water, etc.

It is to be understood that the term "a rubber" is employed in the claims in a generic sense to designate rubbery materials capable of vulcanization when heated with sulfur and includes caoutchouc, balata, gutta percha, latex, rubber isomers, and synthetic rubber whether or not admixed with pigments, fillers, softeners, antioxidants, accelerators, other vulcanizing agents, etc.

While I have herein disclosed specific embodiments of my invention, I do not intend to limit the invention solely thereto, for it will be obvious to those skilled in the art that many modifications such as using other materials having equivalent properties and varying the properties of materials used are within the spirit and scope of the invention as defined in the appended claims.

I claim:

1. The process which comprises vulcanizing a rubber in the presence of a compound containing the structure

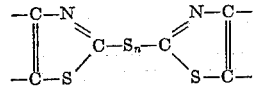

wherein $n$ is one of the integers 3 and 4 and the adjoining carbon atoms do not constitute part of another ring structure, said compound being the sole vulcanizing agent added to the rubber.

2. The process which comprises vulcanizing a rubber in the presence of a compound containing the structure

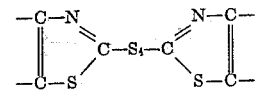

wherein the adjoining carbon atoms do not constitute part of another ring structure, said compound being the sole vulcanizing agent added to the rubber.

3. A rubber composition comprising a rubber which has been vulcanized in the presence of a compound containing the structure

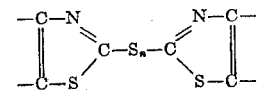

wherein $n$ is one of the integers 3 and 4 and the adjoining carbon atoms do not constitute part of another ring structure, said compound being the sole vulcanizing agent added to the rubber.

4. A rubber composition comprising a rubber which has been vulcanized in the presence of a compound containing the structure

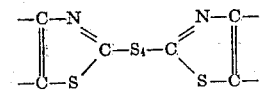

wherein the adjoining carbon atoms do not constitute part of another ring structure, said compound being the sole vulcanizing agent added to the rubber.

5. The process which comprises vulcanizing a rubber in the presence of di-4,5-dimethylthiazyl tetrasulfide, said compound being the sole vulcanizing agent added to the rubber.

6. A rubber composition comprising a rubber which has been vulcanized in the presence of di-4,5-dimethylthiazyl tetrasulfide, said compound being the sole vulcanizing agent added to the rubber.

PAUL C. JONES.

CERTIFICATE OF CORRECTION.

Patent No. 2,264,757. December 2, 1941.

PAUL C. JONES.

It is hereby certified that error appears in the printed specification of the above numbered patent requiring correction as follows: Page 2, first column, line 36, for the word "properties" read --proportions--; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.